United States Patent [19]

Enoshima et al.

[11] 4,380,981

[45] Apr. 26, 1983

[54] KNOCKING CONTROL SYSTEM FOR USE WITH SPARK IGNITION INTERNAL COMBUSTION ENGINE

[75] Inventors: Toshio Enoshima, Fujisawa; Shoji Furuhashi; Hideyuki Tamura, both of Yokohama, all of Japan

[73] Assignee: Nissan Motor Company, Limited, Yokohama, Japan

[21] Appl. No.: 234,007

[22] Filed: Feb. 12, 1981

[30] Foreign Application Priority Data

Feb. 18, 1980 [JP] Japan .................... 55-17811

[51] Int. Cl.³ .................... F02P 5/04; F02P 5/14
[52] U.S. Cl. .................... 123/415; 123/427
[58] Field of Search ............ 123/415, 427, 416, 419, 123/414

[56] References Cited

U.S. PATENT DOCUMENTS

| | | | |
|---|---|---|---|
| 4,002,155 | 1/1977 | Harned et al. | 123/415 |
| 4,015,566 | 4/1977 | Wahl | 123/415 |
| 4,061,116 | 12/1977 | Saida et al. | 123/415 |
| 4,133,325 | 1/1979 | West | 123/427 |
| 4,133,475 | 1/1979 | Harned et al. | 123/414 |
| 4,153,020 | 5/1979 | King et al. | 123/415 |
| 4,153,020 | 5/1979 | King et al. | 123/415 |
| 4,210,111 | 7/1980 | Hattori et al. | 123/414 |
| 4,282,841 | 8/1981 | Takagi et al. | 124/427 |
| 4,289,102 | 9/1981 | Katsumata et al. | 123/415 |
| 4,307,691 | 12/1981 | Nagae et al. | 123/415 |

FOREIGN PATENT DOCUMENTS

| | | | |
|---|---|---|---|
| 9771 | 4/1980 | European Pat. Off. | 123/427 |
| 197806 | 6/1978 | Fed. Rep. of Germany | 123/427 |

*Primary Examiner*—Raymond A. Nelli
*Attorney, Agent, or Firm*—Lane, Aitken & Kananen

[57] ABSTRACT

A knocking control system includes a spark timing adjusting circuit which responds to the magnitude of knocking occurring in the engine to set an amount of retardation of the timing from a reference spark timing within a predetermined range. The spark timing adjusting circuit includes a range change circuit which responds to a drive signal produced from an engine operational state determining circuit, in order to change the predetermined range.

14 Claims, 15 Drawing Figures

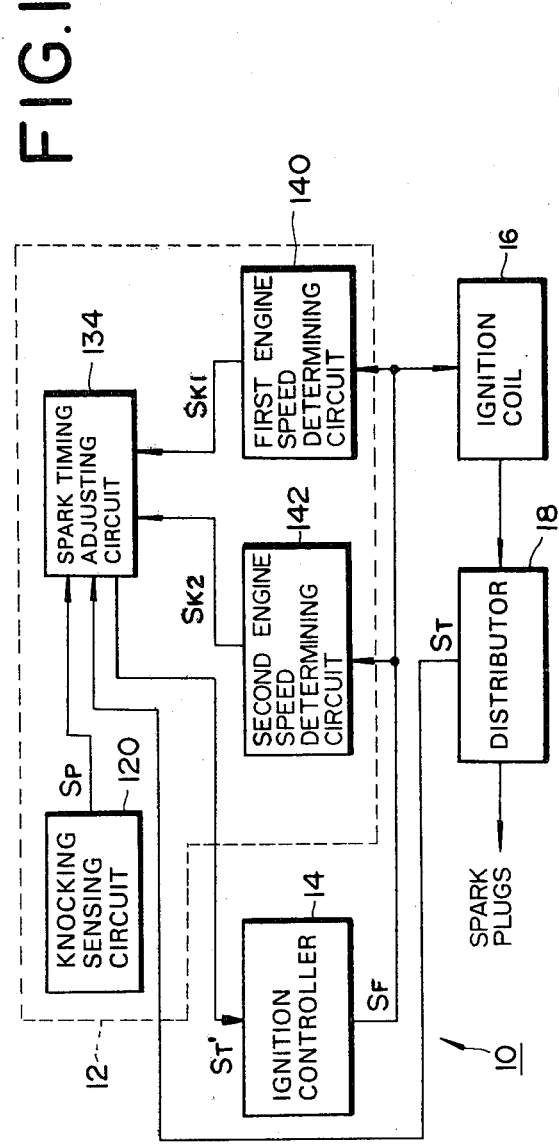
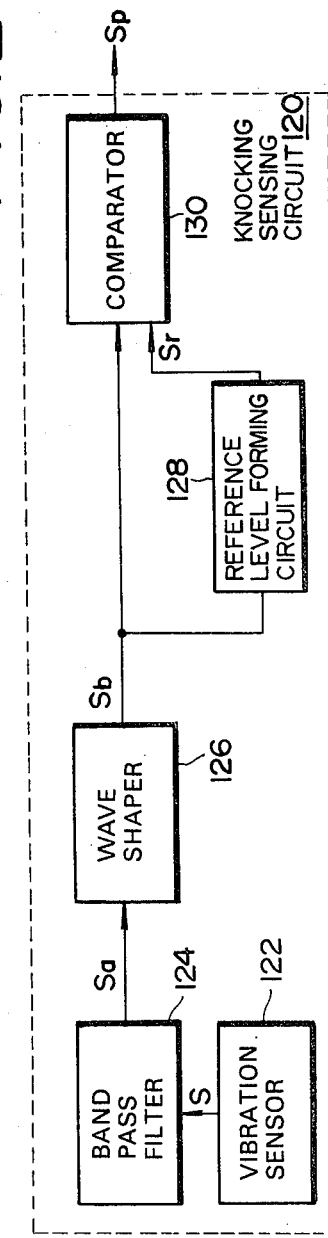

KNOCKING CONTROL SYSTEM FOR USE WITH SPARK IGNITION INTERNAL COMBUSTION ENGINE

BACKGROUND OF THE INVENTION

The present invention relates to a knocking control system for use with a spark ignition internal combustion engine, and more particularly to a knocking control system which retards the spark timing during knocking to suppress or avoid further knocking.

SUMMARY OF THE INVENTION

The present invention provides a knocking control system for a spark ignition internal combustion engine, which includes a spark timing adjusting means which responds to the magnitude of a knocking signal representing the magnitude of knocking occurring in the engine to set the amount of retardation of the timing from a reference spark timing within a predetermined range. The spark timing adjusting means includes range change means which responds to the drive signal by changing the predetermined range.

The knocking control system serves to prevent unnecessary spark timing retardation, which would otherwise lead to unnecessary fuel consumption and as a result a decrease in the engine output power, especially in the range of middle and high engine speeds, and, in extreme cases, damage to the engine due to an excessive increase in the running temperature of the engine. Such overheating will occur if the ignition timing is overly retarded, especially when the engine speed is high.

The knocking control system may include means which prevents retardation of spark timing due to engine vibrations and noise produced by the starter motor during starting of the engine, thereby allowing appropriate starting conditions and smooth speed increase of the engine.

BRIEF DESCRIPTION OF THE DRAWINGS

The objects, features and advantages of the present invention will be apparent from the following description of a preferred embodiment thereof, taken in conjunction with the accompanying drawings, in which the same reference numerals designate corresponding elements:

FIG. 1 is a block diagram of a spark timing control system in which the knocking control system according to the present invention is incorporated;

FIG. 2 is a block diagram of a knocking sensor constituting part of the knocking control system;

DETAILED DESCRIPTION OF THE PREFERRED EMBODIMENTS

Figure 3:
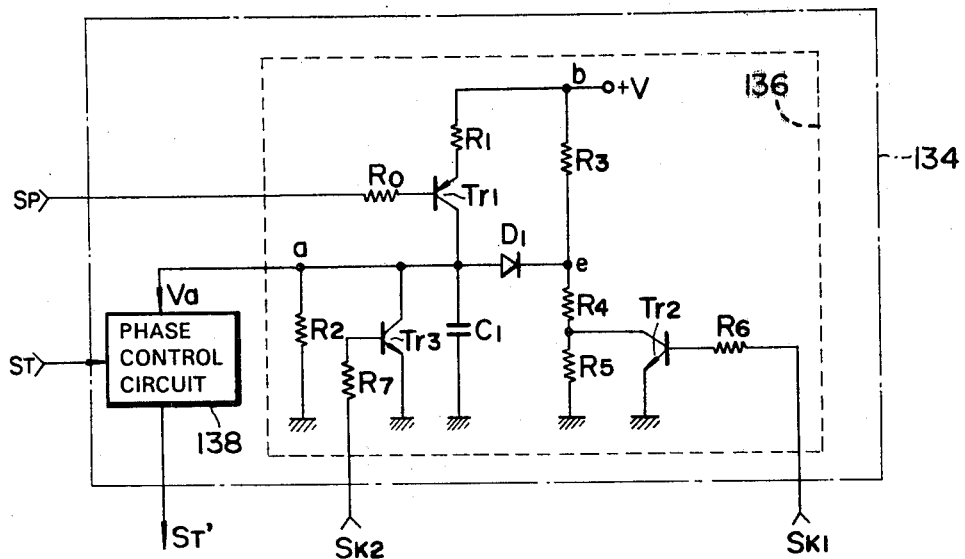
FIG. 3 is a circuit diagram, partially shown in block form, of a spark timing adjusting circuit constituting part of the knocking control system.

In FIGS. 1, 2 and 3, a spark timing system for a spark ignition internal combustion engine which includes a knocking control system 12 according to the present invention, an ignition controller 14, an ignition coil 16 and a distributor 18 is shown generally designated by the reference numeral 10. The knocking control system includes a knocking sensing circuit 120 which in turn includes a vibration sensor 122. This sensor may include, for example, a magnetostrictive element or a piezoelectric element and may be fixed to the cylinder block, cylinder head or intake manifold of the engine to sense vibrations of the engine.

Figure 4:
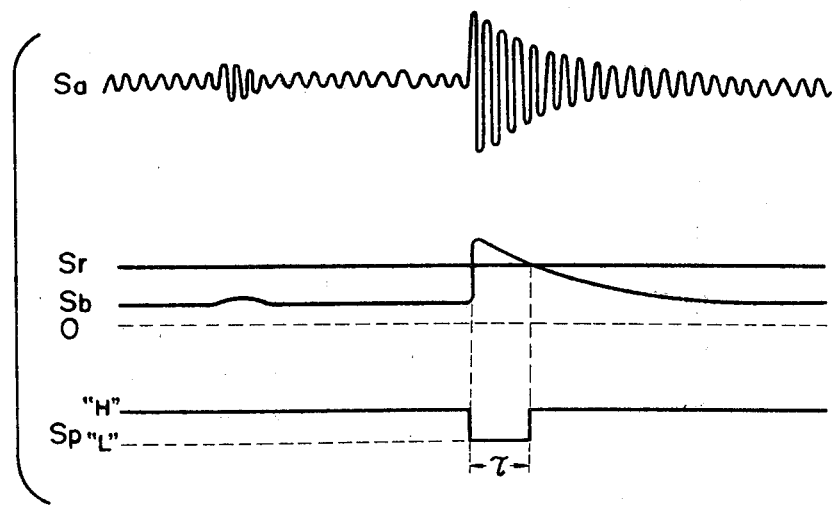
FIG. 4 shows the waveforms of the signals from several elements of the knocking sensor.

The knocking sensing circuit 120 also comprises a band pass filter 124 which, in a typical case, may have a central frequency of for example 7 KHz and a Q ($=f_0/2\Delta f$) of 10, where $f_0$ is the central frequency and $\Delta f$ is the band width of the filter so that the components of the output signal S of the vibration sensor 122 corresponding to knocking are allowed to pass the filter 124. This will be a signal Sa as shown in FIG. 4, substantially in the range of 5 to 10 KHz. Typically, the knocking frequency is substantially included in the range of 5 to 10 KHz although this may depend on the configuration and temperature of the engine combustion chambers. The knocking sensing circuit further includes a wave shaper 126 which rectifies and amplifies the envelope of the signal Sa from the filter 124 to produce a signal Sb, as shown in FIG. 4. The wave shaper may perform either full wave or half wave rectification of the signal Sa.

The knocking sensing circuit 120 further includes a reference level forming circuit 128 which averages the signal Sb from the wave shaper 126 over a fixed time interval in which no knocking occurs, such as directly after sparking, or which the engine piston is in the vicinity of top dead center, and amplifies the averaged signal with a suitable amplification factor to provide a substantially constant reference level or background noise level, shown as Sr in FIG. 4, which represents vibrations not related to knocking. Alternatively, the reference level forming circuit 128 may be constituted by a rectifier which rectifies the signal Sb, an integrating circuit having a relatively large discharge time constant which integrates the rectified signal with respect to time, and an amplifier which amplifies the integrated signal. In this case, a simple amplifier may be used in place of the wave shaper 126.

The knocking sensing circuit 120 includes a comparator 130 which compares the reference signal Sr from the reference level forming circuit 128 with the output Sb from the wave shaper 126 and produces an inverted pulse output shown as Sp in FIG. 4, when the magnitude of Sb is equal to, or greater than, that of Sr. The duration $\tau$ of the pulse Sp corresponds to the magnitude of knocking. The comparator 130 may be one which produces a signal of low level for a predetermined time when the magnitude of Sb is equal to, or greater than, that of Sr.

The knocking control system 12 further includes a spark timing adjusting circuit 134 which in turn comprises an integrating circuit 136. The pulse signal Sp turns on a PNP transistor $Tr_1$ of the integrating circuit 136 through an input resistor $R_0$ for a time $\tau$ corresponding to the magnitude of knocking to cause the power supply $+V$ to charge a capacitor $C_1$ through a resistor $R_1$ and the transistor $Tr_1$ with a relatively small time constant $R_1 \cdot C_1$, thereby producing at a point a a voltage Va corresponding to the magnitude of the knocking. The voltage Va charged across the capacitor $C_1$ discharges gradually through a resistor $R_2$ when the comparator 130 produces a zero output (i.e. $S_p$ goes high), turning off the transistor $Tr_1$.

The spark timing adjusting circuit 134 further includes a phase control circuit 138 which retards the actual spark timing from a reference spark timing signal $S_T$, determined by the distributor 18 according to the operational state of the engine, to a degree depending on the voltage Va produced by the integrating circuit 136 in order to provide an adjusted timing signal $S_T'$ to the ignition controller 14. When the voltage Va is zero, the phase control circuit 138 passes the timing signal $S_T$ as it is. The ignition controller 14 produces a dwell angle signal $S_F$ to control the supply of an electric current flowing through the ignition coil 16 so that sparking is effected at the spark plug of each engine cylinder, not shown, through the distributor 18 so as to suppress or avoid further knocking. The phase control circuit 138 and the ignition controller 14 will be described later in more detail.

Figure 5:
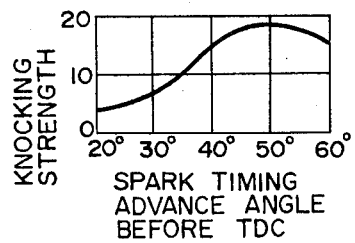
FIG. 5 is a graph showing the relation between spark timing advance angle and knocking strength.

The spark timing and the knocking strength are related as shown in FIG. 5, so that retardation of the spark timing will suppress or avoid knocking. The amount of retardation of the spark timing required to suppress or avoid knocking depends on the operational state of the engine as represented for example by the engine speed. As will be seen from FIG. 6, in the lower engine speed range of, for example, 1,000 to 1,500 rpm, the timing should be retarded from the basic or reference spark timing value $S_T$ by at least the range $\theta m$ where knocking occurs, whereas in the range of high speeds above 4,000 rpm, the timing should be retarded from the reference spark timing only by at least the range $\theta_L$ ($<\theta m$) representing the knocking.

The adjustment range of the spark timing signal used by the spark timing adjusting circuit 134 is determined by the maximum voltage $V \times R_2/(R_1+R_2)$ charged across the capacitor $C_1$. Thus the spark timing adjusting circuit 134 includes a range change circuit for changing the range of adjustment of the timing, i.e. the maximum voltage $V \times R_2/(R_1+R_2)$, according to the operational state of the engine (the engine speed in this particular embodiment). The range change circuit is constituted by resistors $R_3$, $R_4$ and $R_5$ connected in series between the power supply $+V$ and ground, a diode $D_1$ connected between a point a at which the voltage charged across the capacitor $C_1$ is outputted and the junction point e between the resistors $R_3$ and $R_4$ such that the anode of the diode $D_1$ is connected to the point a, an NPN transistor $Tr_2$ whose emitter and collector are connected to ground and the junction between the resistors $R_4$ and $R_5$, respectively, and an NPN transistor $Tr_3$ whose emitter and collector are connected to ground and the point a, respectively.

First and second engine operational state determining circuits are provided which may be first and second engine speed determining circuits 140 and 142 which electrically calculate the engine speed from a spark ignition signal $S_F$ from an ignition controller 14. The first engine speed determining circuit 140 produces a signal $S_{K1}$ of high level only when the calculated engine speed is above a first predetermined value, for example 4,000 rpm, whereas the second engine speed determining circuit 142 produces a signal $S_{K2}$ of high level only when the calculated engine speed is below a second predetermined value, such as 400 rpm, lower than the first predetermined value.

The transistor $Tr_2$ is turned on by the signal $S_{K1}$ to short-circuit the resistor $R_5$ whereas the transistor $Tr_3$ is turned on by the signal $S_{K2}$ to short-circuit the capacitor $C_1$.

Figure 6:
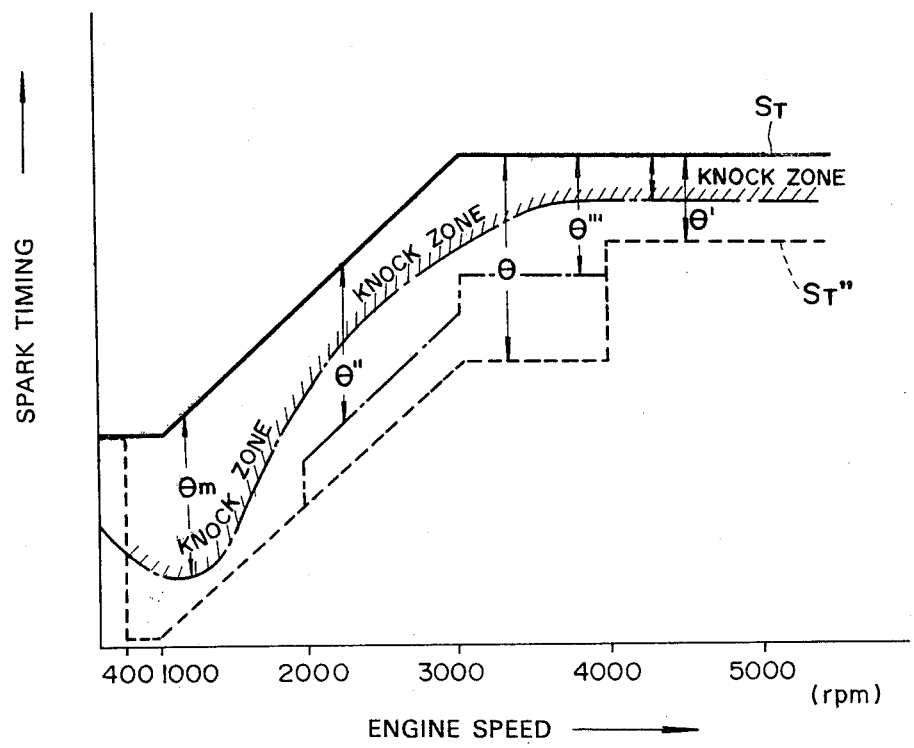
FIG. 6 is a graph showing the relation between engine speed and retardation amount of spark timing from the reference spark timing setting.

Accordingly, the maximum voltage charged across the capacitor $C_1$ of the integrating circuit 136 which determines the adjustment range of the timing is zero when the engine speed is below 400 rpm, $V \times (R_4+R_5)/(R_3+R_4+R_5)$ when the engine speed is between 400 and 4,000 rpm, and $V \times R_4/(R_3+R_4)$ when the engine speed is above 4,000 rpm. Thus, the adjustment range produced by the spark timing adjusting circuit 134 is zero when the engine speed is below 400 rpm, i.e. while the engine is being started, $\theta$ when the engine speed is between 400 and 4,000 rpm, and $\Gamma'$ (smaller than $\theta$) when the engine speed is above 4,000 rpm, as shown in FIG. 6.

Consequently, during starting of the engine, the reference spark timing signal $S_T$ is outputted as it is from the phase control circuit 138 to the ignition controller 14, thereby allowing suitable engine starting and smooth increase in the engine speed. When the engine speed is between 400 and 4,000 rpm, a spark timing signal $S_T'$ retarded according to the magnitude and frequency of knocking in the range of spark timing adjustment $\theta$ is outputted from the phase control circuit 138. When the engine is in the high speed range above 4,000 rpm, even if relatively heavy knocking occurs or light knocking occurs successively, the voltage across the capacitor $C_1$ cannot increase beyond $V \times R_4/(R_3+R_4)$ because any voltage above this value would discharge through the diode $D_1$, the resistor $R_4$ and the transistor $Tr_2$. Thus, the phase control circuit 138 does not retard the spark timing beyond the adjustment range $\theta'$ determined by the voltage $V \times R_4/(R_3+R_4)$ and thus the temperature of the exhaust gas in the engine does not increase excessively due to retardation of the spark timing. Similarly an unnecessary decrease in engine output power and increase in fuel consumption are avoided.

Figure 7:
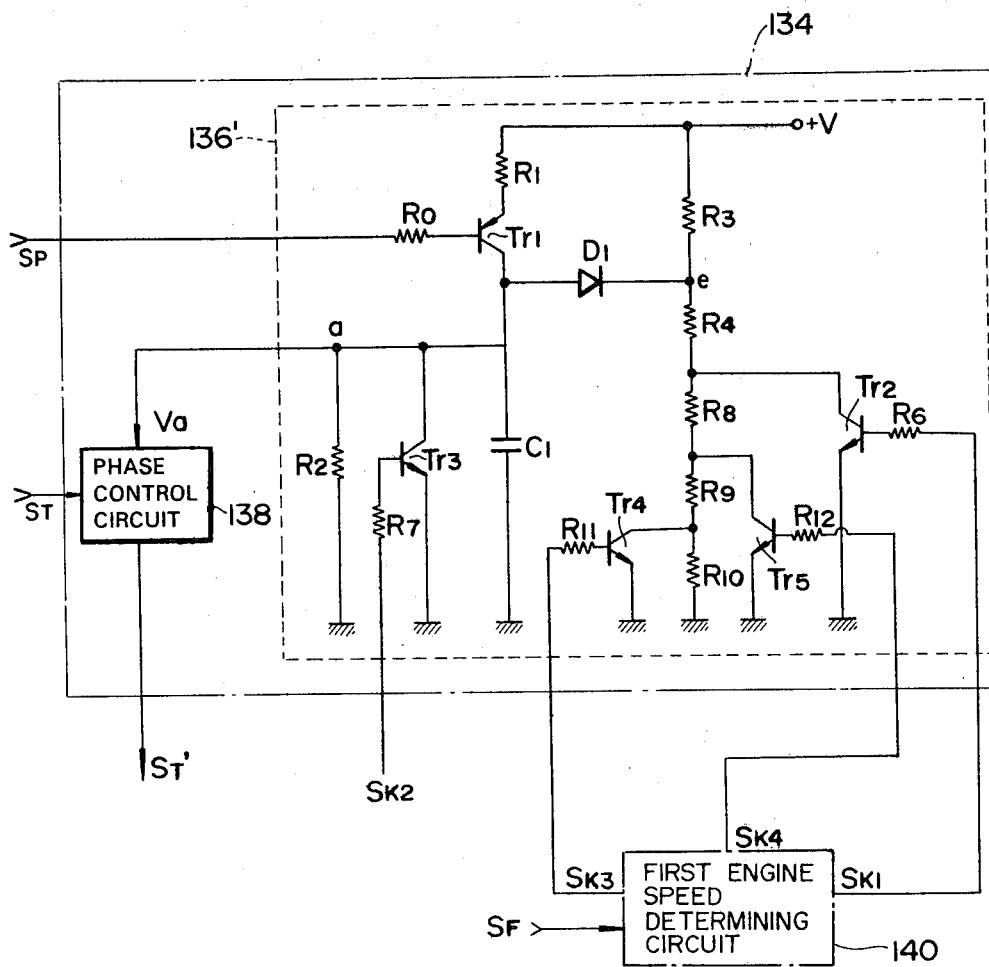
FIG. 7 is a diagram, similar to FIG. 3, of a modification of the spark timing adjusting circuit.

The modification of the knocking control system according to the present invention shown in FIG. 7 is of the same structure and operation as the embodiment of FIG. 3 except that it has two further spark timing adjustment range change circuits operated according to the ranges of engine speeds 2,000 to 3,000 rpm and 3,000 to 4,000 rpm. The integrating circuit 136' includes three series connected resistors $R_8$, $R_9$ and $R_{10}$, whose total resistance is equal to that of the resistor $R_5$ shown in FIG. 3, used in place of the resistor $R_5$, a switching NPN transistor $Tr_4$ whose emitter and collector are connected to ground and the common junction between the resistors $R_9$ and $R_{10}$ respectively, and a switching NPN transistor $Tr_5$ whose emitter and collector are connected to ground and the common junction between the resistors $R_8$ and $R_9$ respectively. The transistors $Tr_4$ and $Tr_5$ are turned on by high level valves of signals $S_{K3}$ and $S_{K4}$ fed through resistors $R_{11}$ and $R_{12}$ from the first engine speed determining circuit 140 when the engine speed is between 2,000 and 3,000 rpm and between 3,000 and 4,000 rpm.

Thus, the maximum voltage charged across the capacitor $C_1$ of the integrating circuit 136′ is $V \times (R_4+R_8+R_9)/(R_3+R_4+R_8+R_9)$ when the engine speed is equal to, or greater than, 2,000 rpm and smaller than 3,000 rpm, and this value is lower than $V \times (R_4+R_8+R_9+R_{10})/(R_3+R_4+R_8+R_9+R_{10})$. It is $V \times (R_4+R_8)/(R_3+R_4+R_8)$ when the engine speed is equal to, or larger than 3,000 rpm and smaller than 4,000 rpm, and this value is still lower than $V \times (R_4+R_8+R_9)/(R_3+R_4+R_8+R_9)$. Consequently, the spark timing adjustment range determined by the spark timing adjusting circuit 134 is between the set reference spark timing line $S_T$ and a dot-dashed line $S_T''$ when the engine speed is between 2,000 and 3,000 rpm, $\theta''$ (smaller than $\theta$) when the engine speed is between 2,000 and 3,000 rpm, and $\theta'$ (smaller than $\theta''$) between 3,000 and 4,000 rpm, as shown in FIG. 6. Thus further unnecessary decreases in engine output power and further unnecessary consumption of fuel are prevented.

The second engine speed determining circuit 142 of each of the embodiments mentioned above may be a magnet switch of the starter motor turned on during starting of the engine to produce a starter signal which turns on the transistor $Tr_3$.

Figure 8:
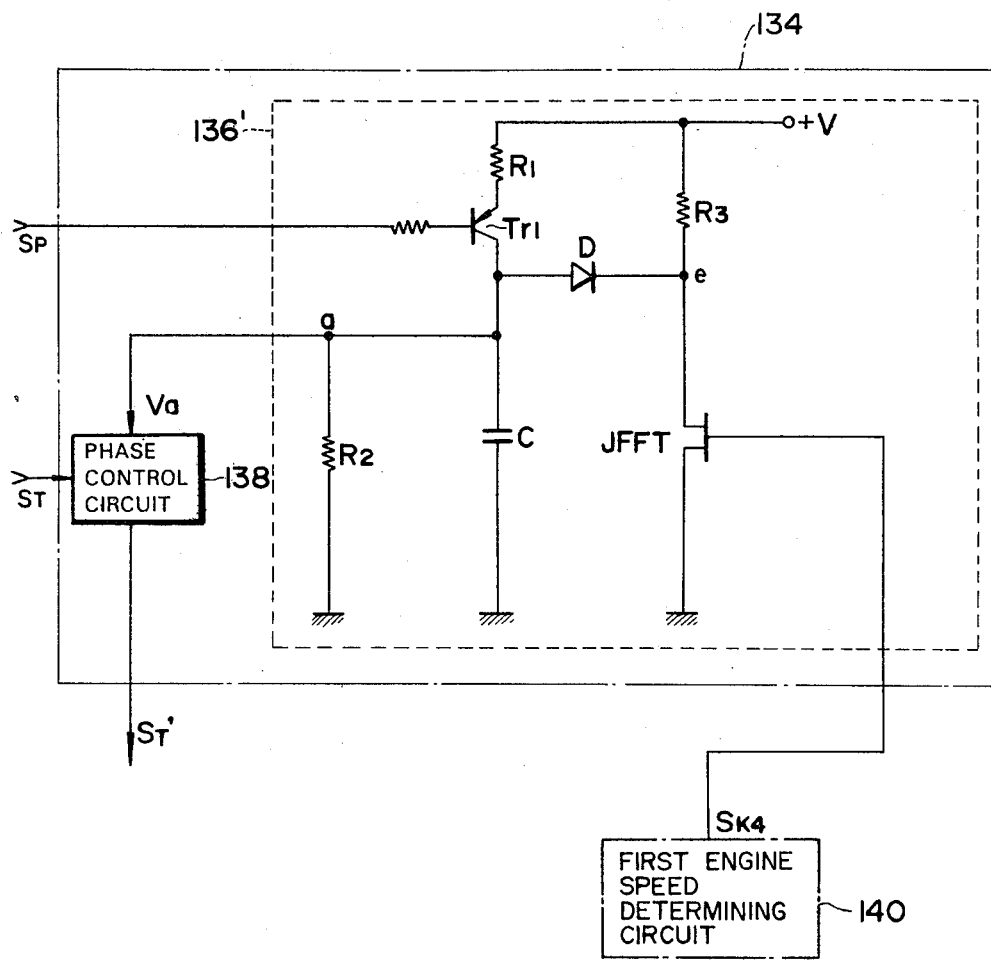
FIG. 8 is a diagram, similar to FIG. 3, of a second modification of the spark timing adjusting circuit.

In the embodiment shown in FIG. 7, the spark timing adjustment is switchable between five steps, but may be readily switched between six, seven or more steps. An electronically controlled resistance element JEFT such as field effect transistors may be provided between the point e and ground in place of the resistors $R_4$ and $R_5$ and the transistor $Tr_2$ in the spark timing adjusting circuit 134 in FIG. 3 and in place of the resistors $R_4$, $R_8$, $R_9$ and $R_{10}$ and the transistors $Tr_2$, $Tr_3$ and $Tr_4$, so that the overall resistance value between the point e and ground may be continuously changed from zero to the sum of resistance values of the resistors $R_4$ and $R_5$ and the sum of resistance values of the resistors $R_4$, $R_8$, $R_9$ and $R_{10}$ according to a signal representing the operational state of the engine from the engine operational state determining circuit. In this case, the transistor $Tr_3$ and the resistor $R_7$ may be omitted, as shown in FIG. 8.

Figure 9:
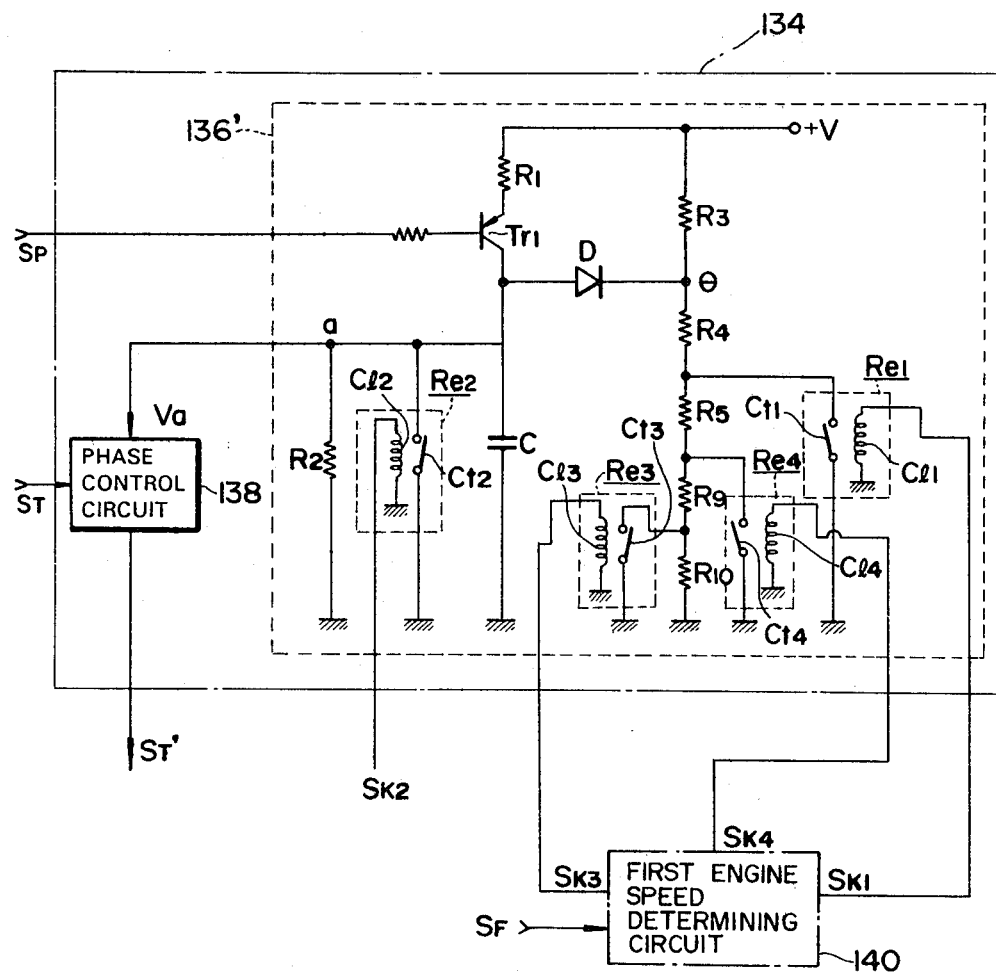
FIG. 9 is a diagram, similar to FIG. 3, of a third modification of the spark timing adjusting circuit.

The transistors $Tr_2$, $Tr_3$, $Tr_4$ and $Tr_5$ in the above embodiments may be replaced by corresponding relays $Re_1$, $Re_2$, $Re_3$ and $Re_4$ which have normally open contacts $ct_1$, $ct_2$, $ct_3$ and $ct_4$ that are closed by their coils $cl_1$, $cl_2$, $cl_3$ and $cl_4$ when energized by the signals $S_{K1}$, $S_{K2}$, $S_{K3}$ and $S_{K4}$ from the engine operational state determining circuits, as shown in FIG. 9.

In the above embodiments, the knocking control system according to the present invention has been shown as being applied to a spark timing system in which a mechanical distributor determines the reference spark timing, but it is not limited to this application. It is of course applicable to digital spark timing systems. The range of adjustment of the spark timing may be changed according to other operational states such as intake manifold vacuum, the degree of opening of a throttle valve or the rate of air intake to the engine.

Figure 10:
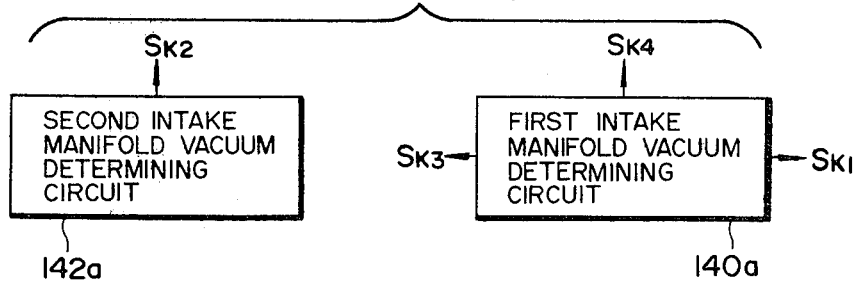
FIG. 10 is a first modification of the engine operational state determining circuit.

More particularly, as shown in FIG. 10, first and second intake manifold vacuum determining circuits 140a, 142a may be provided in place of the engine speed determining circuits 140, 142. The first intake manifold vacuum determining circuit 140a produces the signal $S_{K1}$ when the intake manifold vacuum is above a first vacuum value corresponding to an engine speed of 4,000 rpm, the signal $S_{K4}$ when the intake manifold vacuum is between the first vacuum value and a second vacuum value lower than the first vacuum value and corresponding to an engine speed of 3,000 rpm, and the signal $S_{K3}$ when the intake manifold vacuum is between the second vacuum value and a third vacuum value lower than the second vacuum value and corresponding to an engine speed of 2,000 rpm. The second intake manifold vacuum determining circuit 142a produces the signal $S_{K2}$ when the intake manifold vacuum is between the third vacuum value and a fourth vacuum value lower than the third vacuum value and corresponding to an engine speed of 400 rpm.

Figure 11:
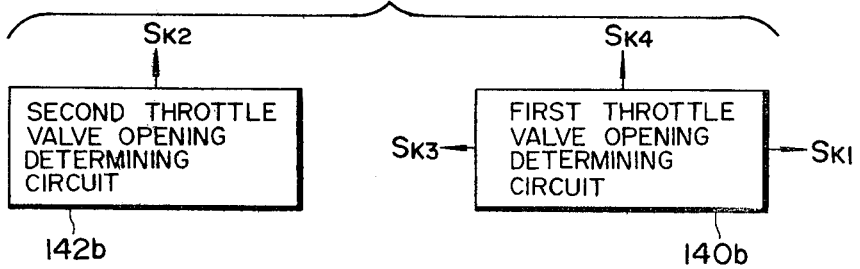
FIG. 11 is a second modification of the engine operational stage determining circuit.

As shown in FIG. 11, first and second throttle valve opening determining circuits 140b, 142b may be provided in place of the engine speed determining circuits 140, 142. The first throttle valve opening determining circuit 140b produces the signal $S_{K1}$ when the degree of opening of a throttle valve is above a first opening value corresponding to an engine speed of 4,000 rpm, the signal $S_{K4}$ when the degree of opening is between the first opening value and a second opening value smaller than the first opening value and corresponding to an engine speed of 3,000 rpm, and the signal $S_{K3}$ when the degree of opening is between the second opening value and a third opening value smaller than the second opening value and corresponding to an engine speed of 2,000 rpm. The second throttle value opening determining circuit 142b produces the signal $S_{K2}$ when the degree of opening is between the third opening value and a fourth opening value smaller than the third opening value and corresponding to an engine speed of 400 rpm.

Figure 12:
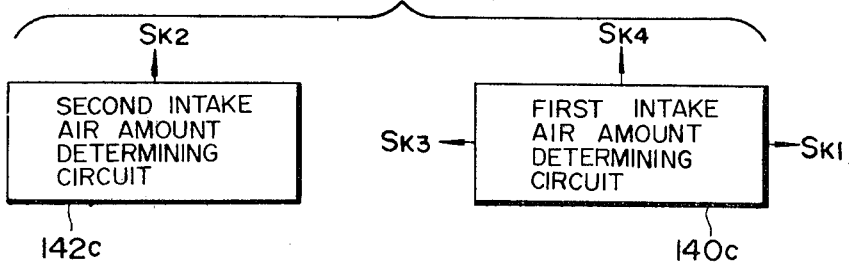
FIG. 12 is a third modification of the engine operational state determining circuit.

As shown in FIG. 12, first and second intake air rate determining circuits 140c, 142c may be provided in place of the engine speed determining circuits 140, 142. The first intake air rate determining circuit 140c produces the signal $S_{K1}$ when the rate of air intake to the engine is above a first intake air value corresponding to an engine speed of 4,000 rpm, the signal $S_{K4}$ when the rate of air intake is between the first intake air value and a second intake air value smaller than the first intake air value and corresponding to an engine speed of 3,000 rpm, and the signal $S_{K3}$ when the rate of air intake is between the second intake air value and a third intake air value smaller than the second intake air value and corresponding to an engine speed of 2,000 rpm. The second intake air amount determining circuit 142c produces the signal $S_{K2}$ when the rate of air intake is between the third intake air value and a fourth intake air value lower than the third intake air value and corresponding to an engine speed of 400 rpm.

Figure 13:
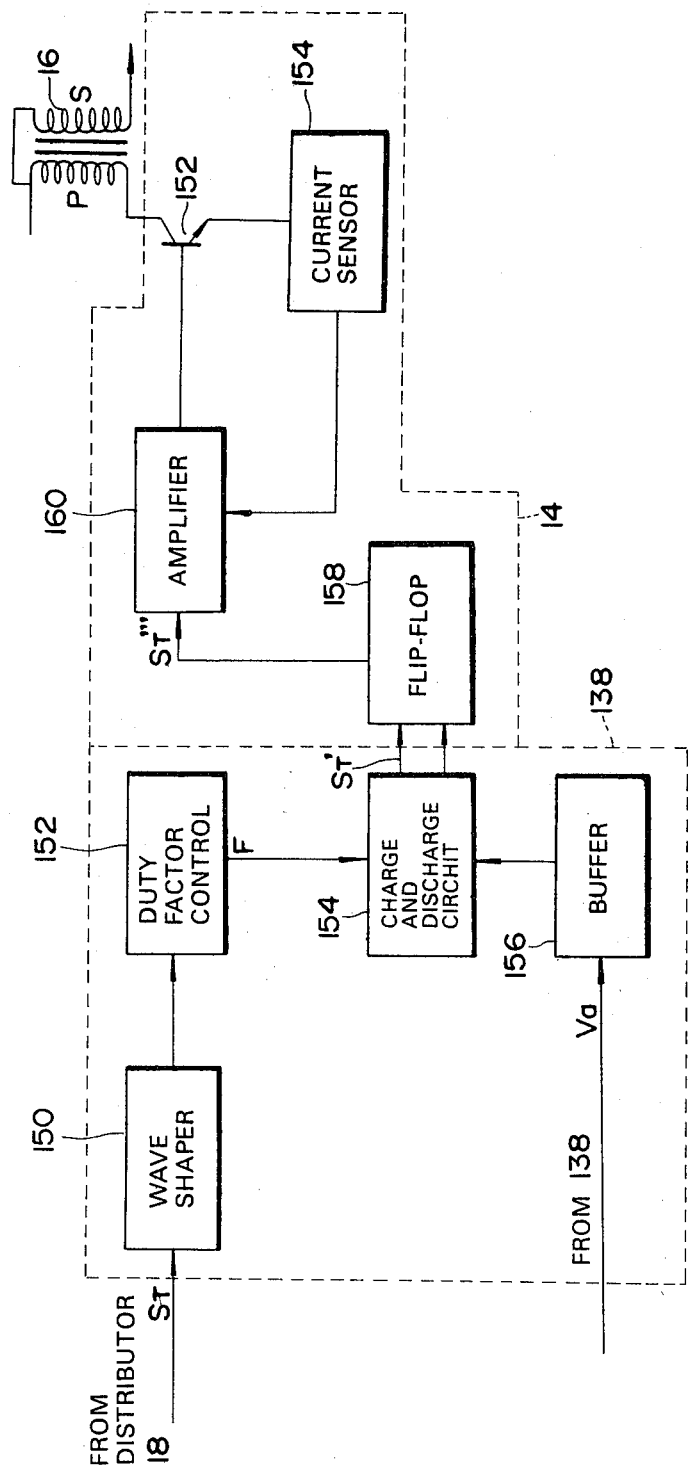
FIG. 13 is a block diagram of the phase control circuit and ignition controller of the spark timing system.
Figure 14:
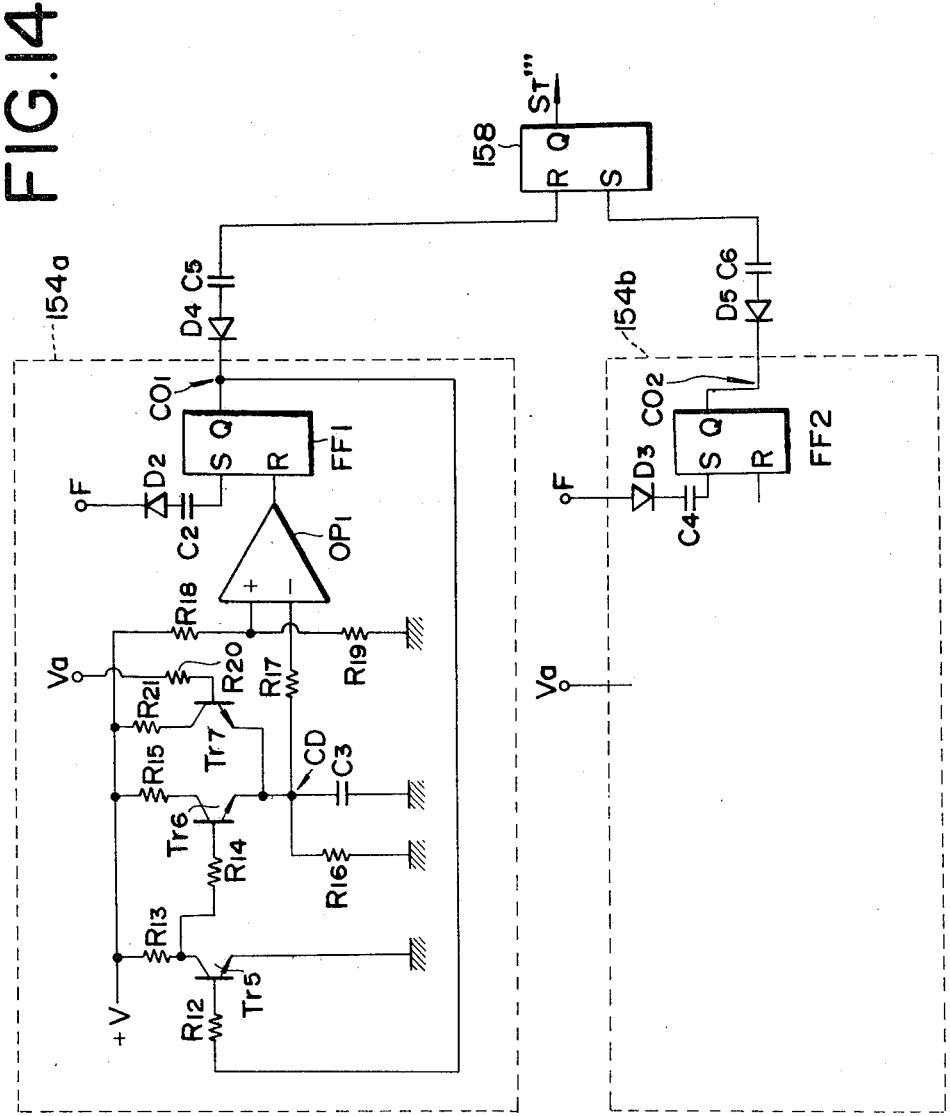
FIG. 14 is a circuit diagram, partially shown in block form, of the phase control circuit.

Details of the structure and operation of the phase control circuit 138 and the ignition controller 14, as mentioned above, are shown in FIGS. 13, 14 and 15. The reference spark timing signal $S_T$, which is a basic crankshaft angle signal determined from governor and vacuum advance angles, is produced once every 180° rotation of the crankshaft in the case of a 4-cylinder engine or once every 120° rotation of the crankshaft in the case of a 6-cylinder engine. The reference spark timing signal $S_T$ from the distributor 18 is shaped by a wave shaper 150 into a signal having regular rectangular pulses which are converted by a duty factor control circuit 152 to a pulse signal F, as shown in FIG. 13, depending on the rotational speed of the crankshaft and the voltage of the power source. The pulses of the signal F have a constant width and their negative-going edges $F_2$ occur at the downward zero crossing points 0 of the signal $S_T$. The output F of the duty factor control circuit 152 is applied to a pair of sub-circuits 154a and 154b constituting a charge and discharge circuit 154. More particularly, in sub-circuit 154a, the output F of the duty factor control circuit 152 forms the input to a series circuit of a diode $D_2$ and a capacitor $C_2$ to the set input of a flip-flop $FF_1$ of the sub-circuit 154a. The flip-flop $FF_1$ is set by the negative-going edge $F_2$ of the signal F and reset by the signal from a comparator $OP_1$ to produce a signal shown by $CO_1$ in FIG. 15. When the signal $CO_1$ is low, a transistor $Tr_5$ is turned off through a resistor $R_{12}$ and a transistor $Tr_6$ is turned on through resistors $R_{13}$ and $R_{14}$ by the power supply $+V$. Thus a capacitor $C_3$ is charged through a resistor $R_{15}$ and the transistor $Tr_6$ and the changing voltage charged across the capacitor $C_3$ is shown by a gradient $m_1$ in FIG. 15. When the Q output of the flip-flop $FF_1$ is high, the transistor $Tr_5$ is turned on and the transistor $Tr_6$ is turned off. Thus, the capacitor $C_3$ is no longer charging and begins to discharge through a resistor $R_{16}$, with the discharging curve being shown by the gradient n in FIG. 15. The output of the comparator $OP_1$ goes high and resets the flip-flop 1 when the potential across the capacitor $C_3$, as shown by the waveform CD in FIG. 15, applied through a resistor $R_{17}$ to the inverting input of the comparator $OP_1$, falls below the voltage level of the input of the comparator $OP_1$ determined by resistors $R_{18}$ and $R_{19}$.

Figure 15:
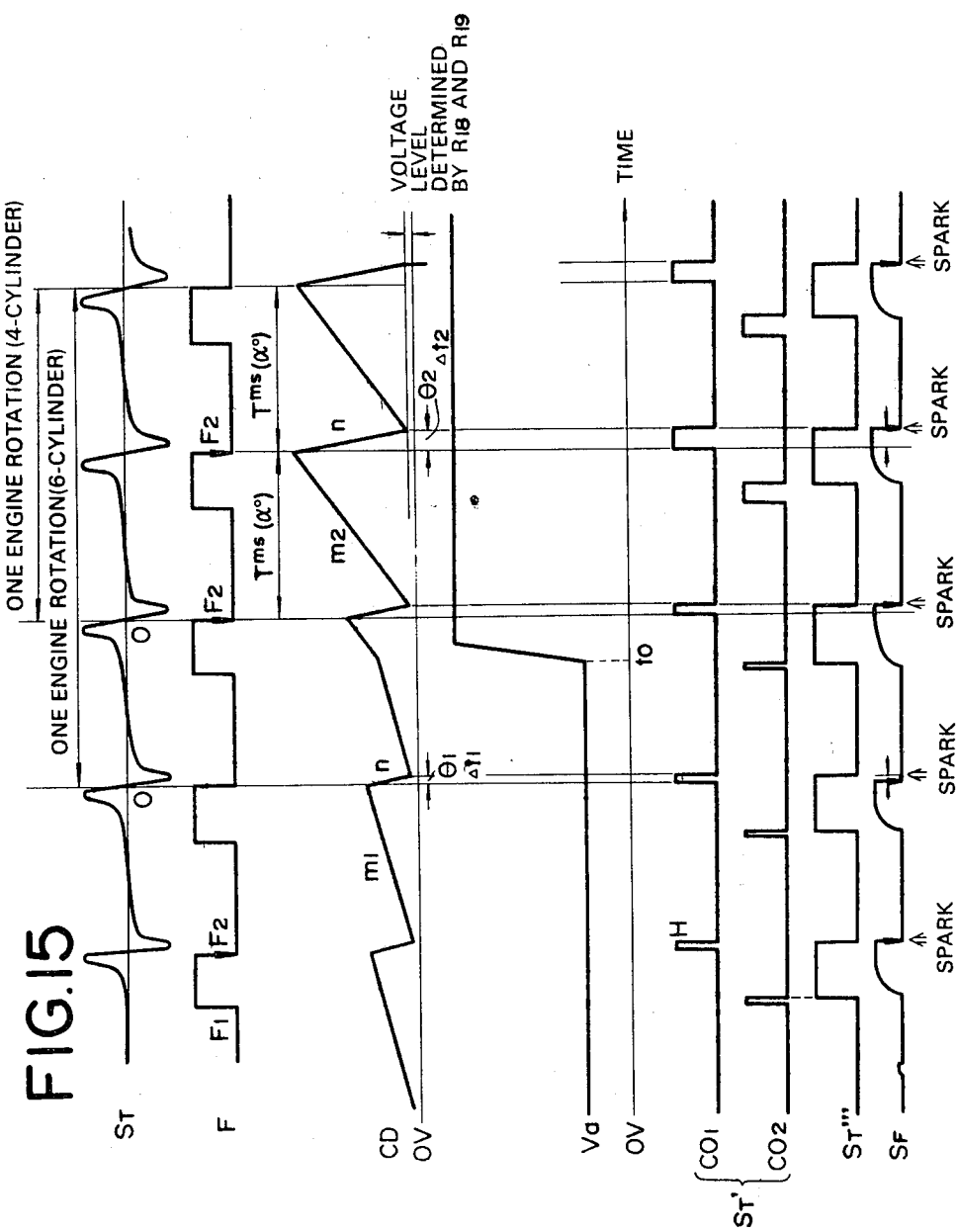
FIG. 15 is a timing chart for the system shown in FIG. 11.

Normally, the above operation is repeated, but when knocking occurs, the output voltage $V_a$ of the integrating circuit 136 increases at a time $\tau_0$, for example as shown in FIG. 15. The wave form of $V_a$ in FIG. 13 is shown in a somewhat simpler form than the actual wave form for the purpose of facilitating description. Thus, a transistor $Tr_7$, in FIG. 14, constituting a buffer 156 of FIG. 13, is turned on through a resistor $R_{20}$. The capacitor $C_3$ is charged by the power supply $+V$ through a resistor $R_{21}$ and transistor $Tr_7$ with an electric current proportional to the output voltage $V_a$ and is also charged through the transistor $Tr_6$ and the resistor $R_{15}$ by the power supply $+V$, with the charging waveform being shown by the gradient $m_2$ in FIG. 15. As the voltage across the capacitor $C_3$ increases, the time required to discharge the capacitor $C_3$ to any desired value increases, as will be seen from comparison of the discharge times $\Delta t_1$ and $\Delta t_2$, shown in FIG. 15. These discharge times correspond to delays from the zero crossing points 0 of the reference spark timing signal $S_T$. The delays vary depending on the charge gradients $m_1$ and $m_2$, and the difference between the discharge times $\Delta t_1$ and $\Delta t_2$ represents the difference between the corresponding spark timings.

In more detail, the charge gradient $m_i$ of the waveform CD in FIG. 15 when the output $V_a$ of the integrating circuit 136 is greater than zero is controlled by the output $V_a$ of the integrating circuit 136, while the discharge gradient n is constant. Here, $$m_i(T-\Delta t_i) = n \times \Delta t_i \quad (1)$$

where $m_i$ is $m_1$ when $V_a$ is zero, and $m_2$ when $V_a$ is positive, T is the period of the signal F, and $\Delta t_i$ is the discharge time corresponding to the discharge gradient n, and is $\Delta t_1$ when $V_a$ is zero, and $\Delta t_2$ when $V_a$ is positive. Transforming the expression (1), $$\frac{\Delta t_i}{T} = \frac{m_i}{m_i + n} \quad (2)$$

Since the delay angle $$\theta_i = \frac{\Delta t_i}{T} \times \alpha \quad (3)$$

where $\alpha$ is 120 degrees in the case of a 6-cylinder engine and 180 degrees in the case of a 4-cylinder engine, substituting the expression (2) into (3):

$$\theta_i = \frac{m_i}{m_i + n} \times \alpha \quad (4)$$

The expression (4) shows that the delay angle $\theta_i$ is a function of the charging gradient $m_i$.

Similarly, the second sub-circuit 154b has the same structure and function as sub-circuit 154a except that diode $D_3$ of sub-circuit 154b is connected in the opposite polarity to that of diode $D_2$ of the sub-circuit 204a through a capacitor $C_4$ to the set input S of a flip-flop $FF_2$ of the sub-circuit 154b such that the flip-flop $FF_2$ is set by the positive-going edge $F_1$, as shown in FIG. 15, of the signal F from the duty factor control circuit 152. Thus, the trailing edges of the output pulses $CO_1$ and $CO_2$ of the circuits 154a and 154b are inputted through diode and capacitor pairs $D_4$, $C_5$ and $D_5$, $C_6$ to the reset input R and set input S respectively of flip-flop 158 of the ignition controller 14 to produce a dwell angle signal, shown by $S_T'''$, in FIG. 15, delayed by a phase angle $\theta_1$ or $\theta_2$ from the duty factor control circuit output F. This signal $S_T'''$, is supplied through an amplifier 160 and a power transistor 162 of the ignition controller 14 to the ignition coil 16. A current sensor 162 senses the current, shown by $S_F$ in FIG. 15, flowing through the power transistor 162 to control the amplification factor of the amplifier 160 and thus control the current flowing through the power transistor 162. The current $S_F$ flowing through the power transistor 162 and the ignition coil 16 produces a spark at the spark plug, not shown, of the corresponding engine cylinder, also not shown, through the distributor 18 at the trailing edge of each of the current $S_F$ pulses.

It will be understood by those skilled in the art that the foregoing description is made in terms of embodiments of the present invention wherein various changes and modifications may be made without departing from the spirit and scope of the invention, which is to be defined by the appended claims.

What is claimed is:

1. A knocking control system for a spark ignition internal combustion engine, comprising:

(a) a reference spark timing determining means for determining a reference spark timing for the engine according to the engine speed and load;

(b) a knocking sensing means for sensing engine knocking to produce a knocking signal representing the presence of the knocking;

(c) an engine operational state determining means for sensing one of engine speed and load to produce a drive signal when said one of engine speed and load is in a predetermined range;

(d) a spark timing adjusting means responsive to the knocking signal for setting an amount of retardation of the timing from the reference spark timing and;

(e) a range change means responsive to the drive signal for determining an allowable maximum amount of spark timing retardation from the reference spark timing such that outside a predetermined range of one of engine speed and load, the allowable maximum amount of spark timing decreases.

2. The knocking control system according to claim 1, wherein said spark timing adjusting means includes a first switching means turned on and off according to the presence and absence, respectively, of the knocking signal, a capacitor charged when said first switching means is turned on, and a discharge resistor through which said capacitor is discharged when said switching means is turned off.

3. The knocking control system according to claim 2, wherein said spark timing adjusting means has a relatively small discharge time constant.

4. The knocking control system according to claim 2 or 3, wherein said range change means includes means providing a voltage level, means for clamping the voltage across said capacitor to the voltage level when the voltage across said capacitor exceeds the voltage level, and means responsive to the drive signal from said engine operational state determining means to change the magnitude of the voltage level.

5. The knocking control system according to claim 4, wherein said voltage level providing means includes a potential divider across which a voltage is applied, said voltage level is supplied from a point on said potential divider, and said changing means includes at least one second switching means responsive to the drive signal for short-circuiting part of said potential divider.

6. The knocking control system according to claim 2 or 3, wherein said range change means includes means responsive to the drive signal for nullifying the amount of retardation adjusted by said spark timing means during starting of said engine.

7. The knocking control system according to claim 6, wherein said nullifying means includes a third switching means responsive to the drive signal from said engine operational state determining means to short-circuit said capacitor.

8. The knocking control system according to claim 4, wherein said range change means includes means responsive to the drive signal for nullifying the amount of retardation adjusted by said spark timing means during starting of said engine.

9. The knocking control system according to claim 8, wherein said nullifying means includes a third switching means responsive to the drive signal from said engine operational state determining means to short-circuit said capacitor.

10. The knocking control system according to claim 5, wherein said range change means includes means responsive to the drive signal for nullifying the amount of retardation adjusted by said spark timing means during starting of said engine.

11. The knocking control system according to claim 10, wherein said nullifying means includes a third switching means responsive to the drive signal from said engine operational state determining means to short-circuit said capacitor.

12. The knocking control system according to claim 4, wherein said engine operational state determining means includes an intake manifold vacuum determining circuit for detecting the intake manifold vacuum to produce the drive signal when the vacuum is in a given range.

13. The knocking control system according to claim 4, wherein said engine operational state determining means includes a throttle valve opening determining circuit for detecting the degree of opening of a throttle valve to produce the drive signal when the degree of opening of a throttle valve is in a given range.

14. The knocking control system according to claim 4, wherein said engine operational state determining means includes an intake air amount determining circuit for detecting the amount of intake air into the engine to produce the drive signal when the amount of intake air is in a given range.

* * * * *